(12) United States Patent
Gaal et al.

(10) Patent No.: US 9,088,974 B2
(45) Date of Patent: Jul. 21, 2015

(54) ANTENNA PORT MANAGEMENT FOR LOCALIZED ENHANCED PHYSICAL DOWNLINK CONTROL CHANNEL TRANSMISSIONS

(71) Applicant: QUALCOMM Incorporated, San Diego, CA (US)

(72) Inventors: Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 13/743,743

(22) Filed: Jan. 17, 2013

(65) Prior Publication Data

US 2014/0198720 A1    Jul. 17, 2014

(51) Int. Cl.
*H04W 72/04* (2009.01)
(52) U.S. Cl.
CPC ............... *H04W 72/04* (2013.01); *Y02B 60/50* (2013.01)

(58) Field of Classification Search
USPC .................................................. 370/328–330
See application file for complete search history.

(56) References Cited

U.S. PATENT DOCUMENTS

| | | | |
|---|---|---|---|
| 2013/0188577 A1* | 7/2013 | Papasakellariou et al. | ... 370/329 |
| 2013/0215842 A1* | 8/2013 | Han et al. | ...... 370/329 |

* cited by examiner

*Primary Examiner* — Vincelas Louis
(74) *Attorney, Agent, or Firm* — Holland & Hart LLP

(57) ABSTRACT

Methods, systems, and devices are described for managing wireless communications. A first decoding candidate and a second decoding candidate are identified from a plurality of decoding candidates for a localized enhanced Physical Downlink Control Channel (EPDCCH) transmission. A first antenna port is identified from a set of antenna ports for the first decoding candidate. A second antenna port is identified from the set of antenna ports for the second decoding candidate. The second antenna port is different from the first antenna port. The localized EPDCCH is decoded based at least on the first and second decoding candidates and the identified first and second antenna ports.

12 Claims, 14 Drawing Sheets

ANTENNA PORT MANAGEMENT FOR LOCALIZED ENHANCED PHYSICAL DOWNLINK CONTROL CHANNEL TRANSMISSIONS

BACKGROUND

The following relates generally to wireless communication, and more specifically to antenna port management for localized enhanced Physical Downlink Control Channel (EPDCCH) transmission in Long Term Evolution (LTE) communication systems. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicat with mobile devices on downstream and upstream links. Each base station has a coverage range, which may be referred to as the coverage area of the cell. Communications on the downstream may carry control information for the mobile device. Mobile devices may monitor these communications to identify and decode the control information. The location of the control information within the transmission may vary. The mobile device may identify various locations and attempt to decode the control information at these locations. The mobile device, however, may not be aware of the antenna port used to transmit this control information. Without knowing the antenna port, the mobile device may not be able to receive the control information.

SUMMARY

The described features generally relate to one or more methods, systems, and devices for managing wireless communications. In one example, the wireless communications may be a localized enhanced Physical Downlink Control Channel (EPDCCH) transmission. In one embodiment, the EPDCCH may be decoded from one of a number of decoding candidates. In one configuration, a first decoding candidate and a second decoding candidate may be identified from a plurality of decoding candidates for the localized EPDCCH. A first antenna port for the first decoding candidate may be identified from a set of antenna ports. Similarly, a second antenna port for the second decoding candidate may be identified from the set of antenna ports. In one example, the second antenna port may be different from the first antenna port. Each decoding candidate of the plurality of decoding candidates may be mapped to a single antenna port from the set of antenna ports. The localized EPDCCH transmission may be decoded based at least on the first and second decoding candidates and the identified first and second antenna ports.

A methods for managing wireless communications is described. A first decoding candidate and a second decoding candidate are identified from a plurality of decoding candidates for a localized enhanced Physical Downlink Control Channel (EPDCCH) transmission. A first antenna port is identified from a set of antenna ports for the first decoding candidate. A second antenna port is identified from the set of antenna ports for the second decoding candidate. The second antenna port is different from the first antenna port. The localized EPDCCH is decoded based at least on the first and second decoding candidates and the identified first and second antenna ports.

In one embodiment, the first decoding candidate and the second decoding candidate are located in a same pair of Physical Resource Blocks (PRBs). Each of the plurality of the decoding candidates may be associated with one or more enhanced control channel elements (ECCEs). In one example, the identification of an antenna port for a decoding candidate may be based at least in part on a starting ECCE associated with the decoding candidate. In one configuration, the first decoding candidate and the second decoding candidate may be of a same aggregation level. An aggregation level may include an integer number of ECCEs.

A device configured to manage wireless communications is also described. The device may include a processor and a memory. Instructions may be stored in the memory. The instructions may be executable by the processor to identify a first decoding candidate and a second decoding candidate from a plurality of decoding candidates for a localized enhanced Physical Downlink Control Channel (EPDCCH) transmission. The instructions may also be executable by the processor to identify a first antenna port from a set of antenna ports for the first decoding candidate, and identify a second antenna port from the set of antenna ports for the second decoding candidate. The second antenna port may be different from the first antenna port. The instructions may be further executable by the processor to decode the localized EPDCCH based at least on the first and second decoding candidates and the identified first and second antenna ports.

An apparatus configured to manage wireless communications is also described. The apparatus may include means for identifying a first decoding candidate and a second decoding candidate from a plurality of decoding candidates for a localized enhanced Physical Downlink Control Channel (EPDCCH) transmission. The apparatus may also include means for identifying a first antenna port from a set of antenna ports for the first decoding candidate, and means for identifying a second antenna port from the set of antenna ports for the second decoding candidate. The second antenna port may be different from the first antenna port. The apparatus may further include means for decoding the localized EPDCCH based at least on the first and second decoding candidates and the identified first and second antenna ports.

A computer program product for managing wireless communications is also described. The computer program product may include a non-transitory computer-readable medium storing instructions executable by a processor to identify a first decoding candidate and a second decoding candidate from a plurality of decoding candidates for a localized enhanced Physical Downlink Control Channel (EPDCCH) transmission. The instructions may also be executable by the processor to identify a first antenna port from a set of antenna ports for the first decoding candidate, and identify a second antenna port from the set of antenna ports for the second decoding candidate. The second antenna port may be different from the first antenna port. The instructions may be further executable by the processor to decode the localized EPDCCH based at least on the first and second decoding candidates and the identified first and second antenna ports.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 shows a block diagram of an example of a processor module for implementing functionality of the communications management subsystem;

DETAILED DESCRIPTION

Management of wireless communications in a wireless communications system is described. In particular, antenna port management for localized EPDCCH transmissions is described. In earlier releases of Long Term Evolution (LTE) protocols, the Physical Downlink Control Channel (PDCCH) may be located in the first few control symbols in a subframe. The PDCCH may be fully distributed across the system bandwidth. In one configuration, the PDCCH may be time division multiplexed (TDMed) with a Physical Downlink Shared Channel (PDSCH). As a result, the subframe may be divided into a control region and a data region.

In later releases of LTE, the EPDCCH may be used. Unlike legacy PDCCH, which occupies the first several control symbols in a subframe, EPDCCH may occupy the data region of the subframe (similar to PDSCH). The use of EPDCCH may increase control channel capacity, support frequency-domain Inter-Cell Interference Coordination (ICIC), achieve improved spatial reuse of control channel resource, support beamforming and/or diversity, and operate on new carrier types and in Multicast-Broadcast Single Frequency Network (MBSFN) subframes. EPDCCH may also coexist on the same carrier as legacy user equipments (UEs).

In one configuration, localized and distributed transmission of the EPDCCH may be supported. For localized transmission (and for distributed transmission where a Cell-Specific Reference Signal (CRS) is not used for demodulation of the EPDCCH), the demodulation of the EPDCCH may be based on a Demodulation Reference Signal (DM-RS) transmitted in one or more Physical Resource Blocks (PRB(s)) that are used for transmission of the EPDCCH. In one embodiment, certain antenna ports may be used to transmit the EPDCCH. In one configuration, a UE may monitor for an EPDCCH in a subframe. The UE may monitor for the EPDCCH in at least a UE-specific search space. In one example, the UE-specific search space may include a set of decoding candidates (or decoding hypotheses). The present systems, methods, and devices may map each decoding candidate to a specific antenna port used to transmit the localized EPDCCH.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
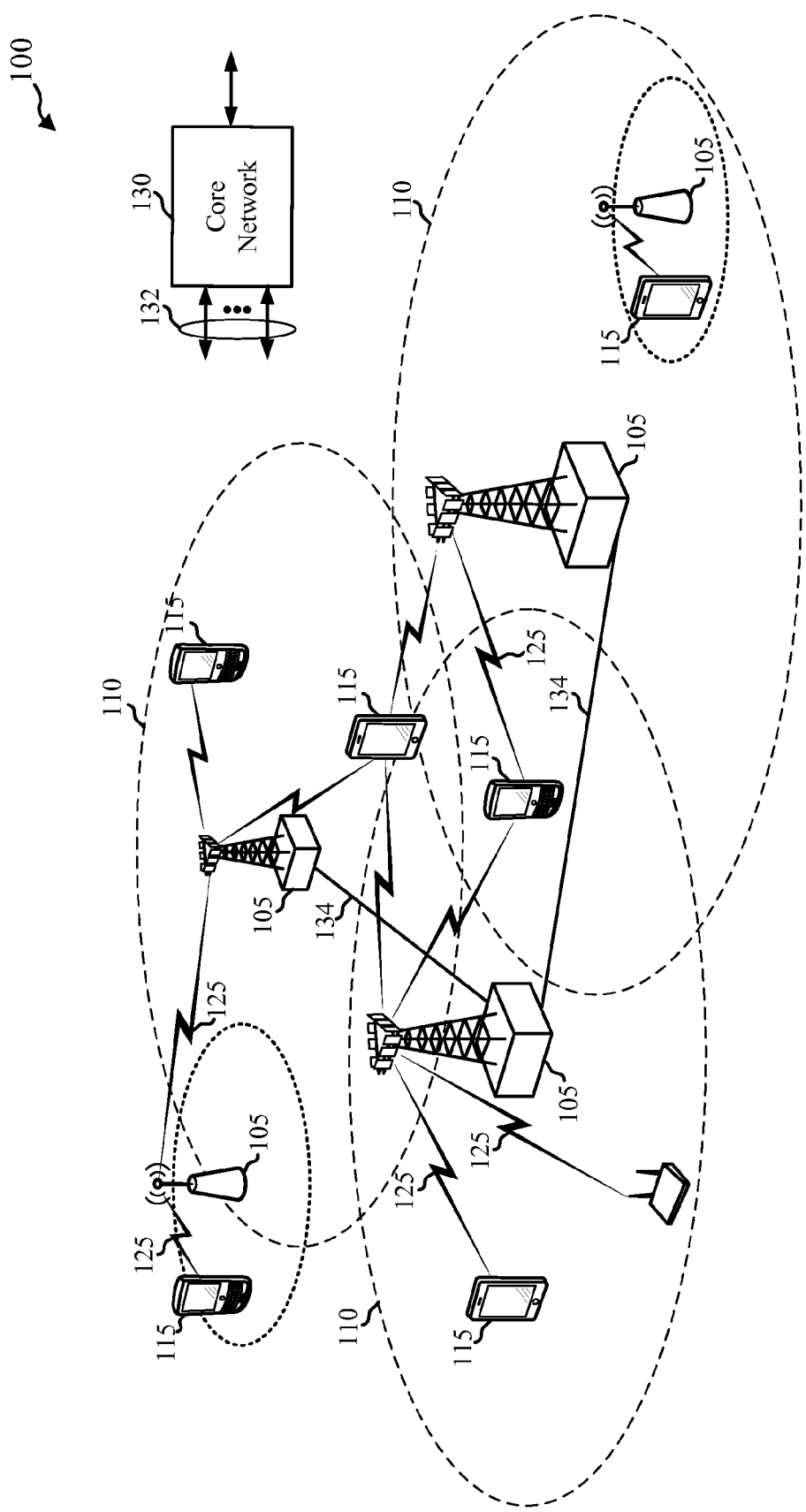
FIG. 1 shows a block diagram of a wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, an evolved NodeB (eNodeB or eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

In some embodiments, the system 100 may be an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells. In one embodiment, an eNB 105 select between various antenna ports to use for a localized EPDCCH transmission to a UE 115. The selected antenna port may be based at least in part on a decoding candidate that may be used to carry the EPDCCH.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one configuration, the UE 115 may identify a decoding candidate for a localized EPDCCH. The UE 115 may further identify an antenna port mapped from the identified decoding candidate. The UE 115 may decode the localized EPDCCH based at least in part on the identified decoding candidate and the identified antenna port. In one embodiment, a decoding candidate may be mapped to a single antenna port for localized EPDCCH transmissions.

The transmission links 125 shown in network 100 may include uplink transmissions from a mobile device 115 to a base station 105, and/or downlink transmissions, from a base station 105 to a mobile device 115. The downlink transmissions may also be called forward link transmissions while the uplink transmissions may also be called reverse link transmissions. While the wireless system 100 is described in relation to LTE/LTE-Advanced architectures, those skilled in the art will readily appreciate, the various concepts presented throughout this disclosure may be extended to other types of wireless networks.

Figure 2:
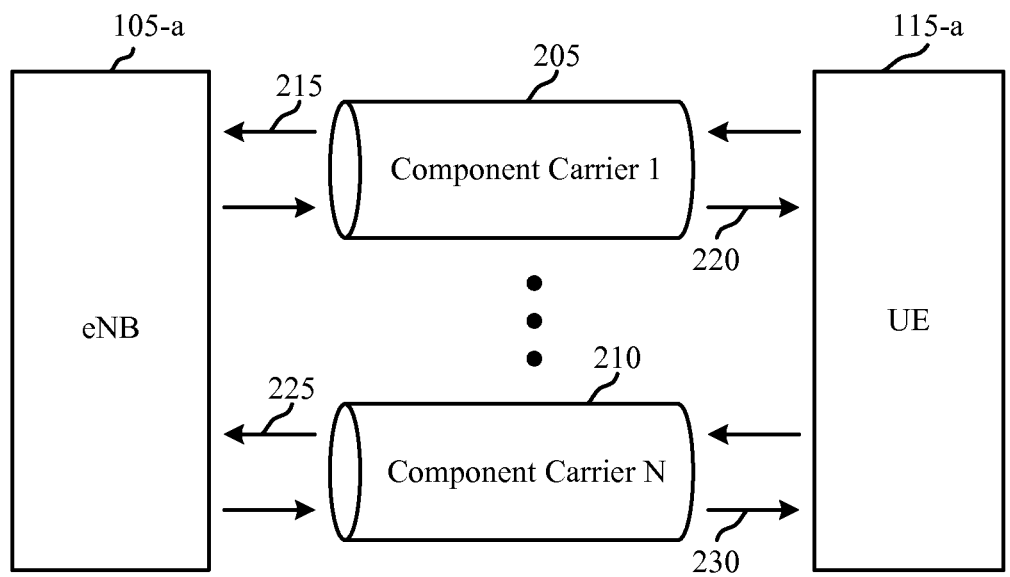
FIG. 2 illustrates a system that can be used in accordance with the disclosed embodiments.

FIG. 2 illustrates a system 200 that can be used in accordance with the disclosed embodiments. The system 200 may include a UE 115-*a*, which may communicate with an eNB 105-*a* (e.g., a base station, access point, etc.) using one or more component carriers 1 through N ($CC_1$-$CC_N$). The UE 115-*a* and eNB 105-*a* may be examples of the UE 115 and eNB 105 of FIG. 1. While only one user equipment 115-*a* and one eNB 105-*a* are illustrated in FIG. 2, it will be appreciated that the system 200 may include any number of UEs 115 and/or eNBs 105.

In one embodiment, the eNB 105-*a* may transmit information to the UE 115-*a* over forward (downlink) channels 220 and 230 on component carriers $CC_1$ 205 through $CC_N$ 210. In addition, the UE 115-*a* may transmit information to the eNB 105-*a* over reverse (uplink) channels 215 and 225 on component carriers $CC_1$ 205 though $CC_N$ 210. In describing the various entities of FIG. 2, as well as other figures associated with some of the disclosed embodiments, for the purposes of explanation, the nomenclature associated with a 3GPP LTE or LTE-A wireless network is used. However, it is to be appreciated that the system 200 may operate in other networks such as, but not limited to, an OFDMA wireless network, a CDMA network, a 3GPP2 CDMA2000 network and the like.

In LTE-A based systems, the UE 115-*a* may be configured with multiple component carriers utilized by the eNB 105-*a* to enable a wider overall transmission bandwidth. As illustrated in FIG. 2, the UE 115-*a* may be configured with "component carrier 1" 205 through "component carrier N" 210, where N is an integer greater than or equal to one. While FIG. 2 depicts two component carriers, it is to be appreciated that the UE 115-*a* may be configured with any suitable number of component carriers and, accordingly, the subject matter disclosed herein and the claims are not limited to two component carriers. Component carrier 205 through 210 may include respective downlinks 220 and 230 as well as respective uplinks 215 and 225.

In multi-carrier operations, Downlink Control Information (DCI) messages associated with different UEs may be carried on a plurality of component carriers. For example, the DCI on a PDCCH may be included on the same component carrier that is configured to be used by a UE for PDSCH transmissions (i.e., same-carrier signaling). Alternatively, or additionally, the DCI may be carried on a component carrier different from the target component carrier used for PDSCH transmissions (i.e., cross-carrier signaling). In some embodiments, a carrier indicator field (CIF), which may be semi-statically enabled, may be included in some or all DCI formats to facilitate the transmission of PDCCH control signaling from a carrier other than the target carrier for PDSCH transmissions (cross-carrier signaling). In one embodiment, the UE 115-*a* may identify one or more decoding candidates from a number of decoding candidates that may include the DCI message. Based on the identified candidates, the UE 115-*a* may identify an antenna port that is mapped from each decoding candidate. In one configuration, each decoding candidate may be mapped to a single antenna port.

Figure 3:
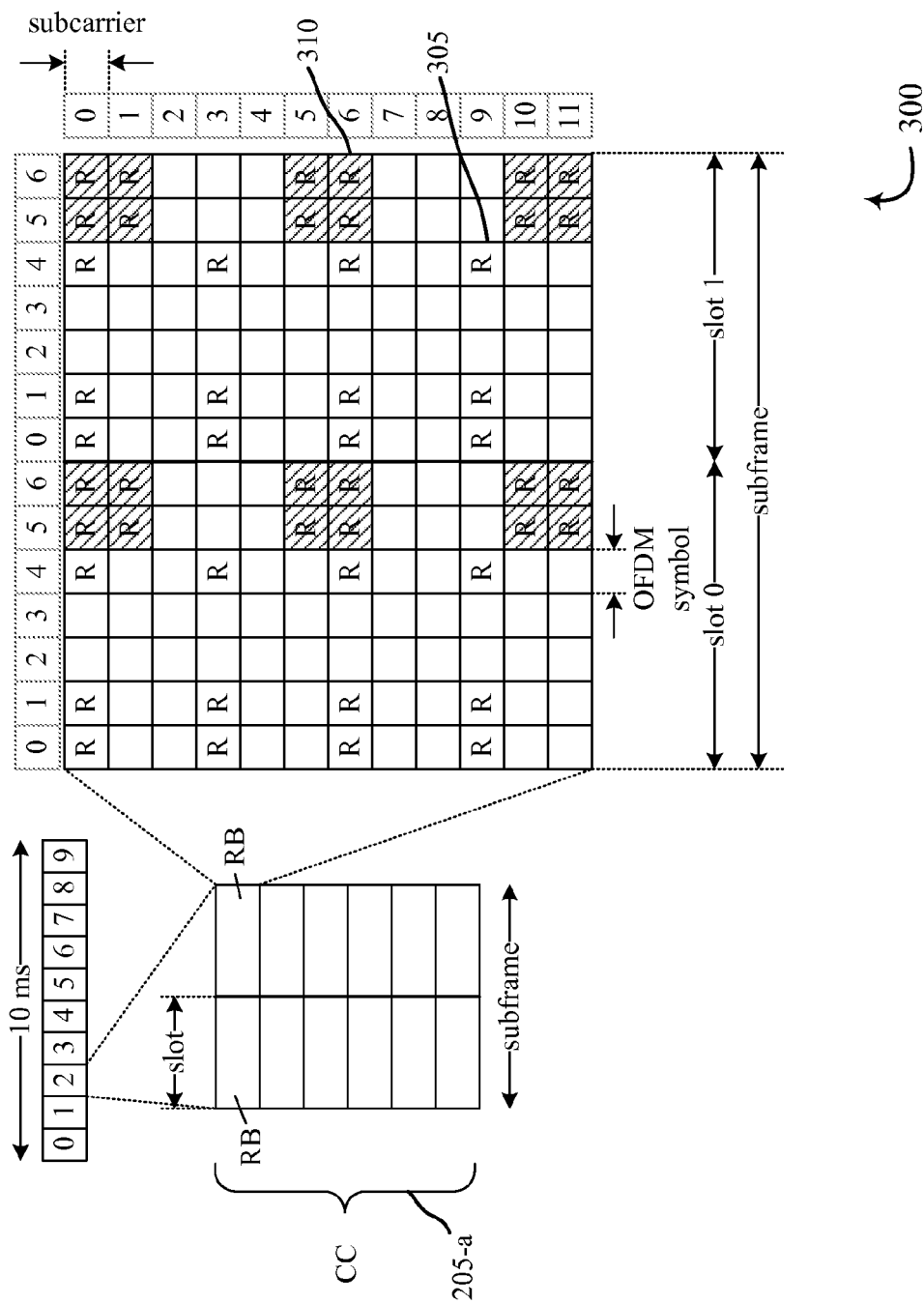
FIG. 3 is a diagram illustrating an example of a frame structure that may be used in a wireless communication system.

FIG. 3 is a diagram illustrating an example of a frame structure 300 that may be used in a wireless communication system, including the wireless communication systems 100 and/or 200 described above with reference to FIGS. 1 and/or 2. The frame structure 300 may be used in LTE or similar systems. A frame (10 ms) may be divided into 10 equally sized sub-frames. Each subframe may include two consecutive time slots. A component carrier (CC) 205-a may be illustrated as a resource grid representing two time slots, each time slot including a resource block. The resource grid may be divided into multiple resource elements. The component carrier 205-a may be an example of the component carrier 205 illustrated in FIG. 2.

In LTE, a resource block may include 12 consecutive subcarriers in the frequency domain and, for a normal cyclic prefix in each OFDM symbol, 7 consecutive OFDM symbols in the time domain, or 84 resource elements. Some of the resource elements, as indicated as R 305, 310, may include DL reference signals (DL-RS). The DL-RS may include CRS (also referred to as common RS) 305 and UE-specific RS (UE-RS) 310. UE-RS 310 may be transmitted on the resource blocks upon which the corresponding PDSCH is mapped. The number of bits carried by each resource element may depend on the modulation scheme. Thus, the more resource blocks that a UE receives and the higher the modulation scheme, the higher the data rate may be for the UE.

When transmission diversity is used to transmit data, multiple versions of the same data may be transmitted over multiple channels. Each of the channels may be defined according to one or more partitions in a time domain (e.g., time slots), frequency domain (e.g., subcarriers), coding domain (e.g., CDMA coding), or antenna/direction (e.g., different antenna ports). Thus, using the example frame structure 300 of FIG. 3, transmission diversity may be achieved by transmitting the different versions of the data using different resource elements. However, transmission diversity may also be achieved by transmitting the different versions of the data using the same resource elements and different coding, antennas, or direction. Thus, a UE or base station that receives an interference signal corresponding to certain resource elements in a frame may monitor other resource elements for different versions of the same interference signal. The UE or base station may further monitor the same or different resource elements with respect to other coded or directional channels for different versions of the interference signal. If the UE or base station determines that transmission diversity is used with respect to the interference signal, the UE or base station may combine two or more of the received versions of the interference signal to estimate and cancel the interference signal.

Figure 4:
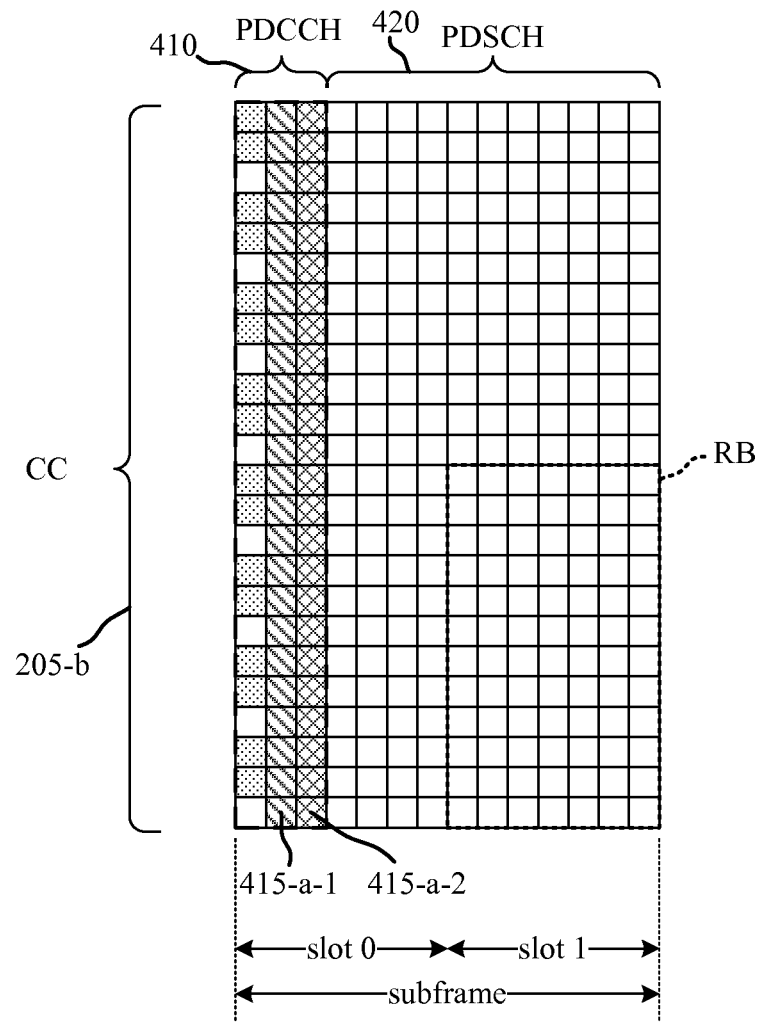
FIG. 4 shows an example frame structure for a component carrier, according to various embodiments.

Turning next to FIG. 4, an example frame structure 400 for a component carrier 205-b is illustrated, according to various embodiments. FIG. 4 may illustrate, for example, a frame structure 400 for a component carrier 205-b for an LTE/LTE-A system. In LTE/LTE-A systems, the PDSCH 420 may carry the data and signaling information to the UE; while the PDCCH 410 may carry a DCI message. In the illustrated example, the component carrier 205-b is illustrated with 24 subcarriers for simplicity. It should be understood that component carrier 205-b may be configured with more or fewer subcarriers in various embodiments. The component carrier 205-b may be an example of the component carrier of FIGS. 2 and/or 3.

As illustrated in FIG. 4, PDCCH 410 is generally TDMed with PDSCH 420 and generally is fully distributed within the entire bandwidth of the component carrier 205-b within a first region of each subframe. In the example illustrated in FIG. 4, PDCCH 410 includes two PDCCH blocks 415-a-1 and 415-a-2. PDCCH 410 may include more or fewer PDCCH blocks 415 as is appropriate based on the control information for served UEs. The PHICH and/or PCFICH channels may be found in the first symbol of PDCCH 410, as illustrated by the shaded blocks in the first symbol of the illustrated subframe for component carrier 205-b.

The DCI may include information regarding the downlink scheduling assignments, uplink resource grants, transmission scheme, uplink power control, hybrid automatic return repeat request (HARM) information, modulation and coding schemes (MCS) and other information. A DCI can be UE-specific (dedicated) or cell-specific (common) and placed in different dedicated and common search spaces within the PDCCH depending on the format of the DCI. A UE attempts to decode the DCI by performing a process known as a blind decode, during which a plurality of decode attempts are carried out in the search spaces until the DCI is detected.

The size of the DCI messages can differ depending on the type and amount of information that is carried by the DCI. For example, if spatial multiplexing is supported, the size of the DCI message is larger compared to scenarios where contiguous frequency allocations are made. Similarly, for a system that employs MIMO, the DCI may include additional signaling information that is not needed for systems that do not utilize MIMO. Accordingly, the DCI has been categorized in different formats that are suited for different configurations. The size of a DCI format depends not only on the amount of information that is carried within the DCI message, but also on other factors such as the transmission bandwidth, the number of antenna ports, TDD or FDD operating mode, etc.

It should be noted that in some systems, the DCI messages are also appended with cyclic redundancy check (CRC) bits to for error detection. The coded DCI bits are then mapped to control channel elements (CCEs) according to the DCI format. A PDCCH can carry DCI messages associated with multiple user equipments. A particular UE must, therefore, be able to recognize the DCI messages that are intended for that particular UE. To that end, a UE may be assigned certain identifiers (e.g., a cell radio network temporary identifier (C-RNTI) that facilitates the detection of the DCI associated with that UE. To reduce signaling overhead, the CRC bits that are attached to each DCI payload are scrambled (e.g., masked) with the identifier (e.g., C-RNTI) associated with a particular UE and/or an identifier that is associated with a group of UEs. In an operation known as a "blind decode," the UE may descramble (or de-mask) all potential DCI messages using its unique identifier, and perform a CRC check on the DCI payload. If the CRC check passes, the content of the control channel is declared valid for the UE, which can then process the DCI.

To reduce power consumption and overhead at the UE, a limited set of CCE locations may be specified, wherein the set of CCE locations include locations at which a DCI payload associated with a particular UE can be placed. For example, a CCE may include nine logically contiguous resource element groups (REGs), where each REG includes 4 resource elements (REs). Each RE is one frequency-time unit. CCEs may be aggregated at different levels (e.g., 1, 2, 4 and 8) depending on the DCI format and the system bandwidth. The set of CCE locations in which the UE can find its corresponding DCI messages are considered a search space. The search space may be partitioned into two regions: a common CCE region or search space and a UE-specific (dedicated) CCE region or search space. The common CCE region is monitored by all UEs served by an eNB and may include information such as paging information, system information, random access procedures and the like. The UE-specific CCE region includes user-specific control information and is configured individually for each UE. CCEs are numbered consecutively and common search spaces and UE-specific search spaces may span overlapping CCEs. The common search space may start from CCE 0, while UE-specific search spaces have starting CCE indices that depend on the UE ID (e.g., C-RNTI), the subframe index, the CCE aggregation level and other random seeds.

In LTE/LTE-A Rel. 11, an EPDCCH is introduced. The main difference between the EPDCCH and PDCCH channels is that the EPDCCH may be scheduled in the time and frequency domains rather than generally being found in the control regions at the beginning of subframes spanning substantially the entire carrier bandwidth of the component carrier. The EPDCCH may increase control channel capacity and take advantage of gain mechanisms such as frequency domain scheduling, beamforming, and link adaptation previously only used to transmit data within the component carrier. In addition, the EPDCCH may help support frequency-domain ICIC and improve spatial reuse of control channel resources. UEs supporting EPDCCH may coexist on the same component carrier as legacy UEs supporting only PDCCH. Multiplexing of PDSCH and EPDCCH within a PRB pair may not be permitted. In one embodiment, a UE may identify one of more decoding candidates within the PRB pair that may include the EPDCCH transmission. Based on the index of the starting ECCE of each identified decoding candidate, the UE may also identify the antenna port that is mapped from each decoding candidate. The UE may then attempt to decode the EPDCCH at based on the identified decoding candidates and the identified antenna ports.

Figure 5:
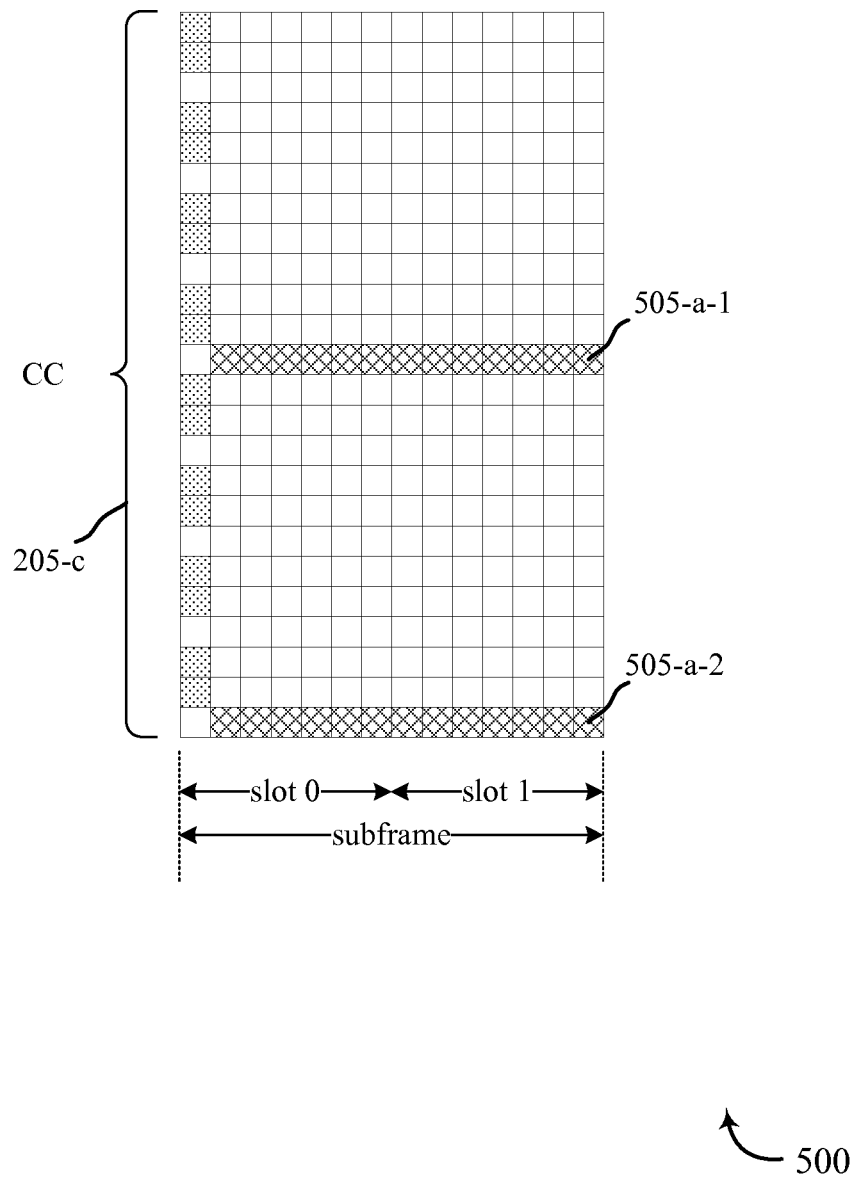
FIG. 5 illustrates an example frame structure of a component carrier employing an EPDCCH control channel, in accordance with various embodiments.

FIG. 5 illustrates an example frame structure 500 of an LTE Rel. 11 component carrier 205-c employing an EPDCCH control channel 505 in accordance with various embodiments. The component carrier 205-c may be an example of the component carrier illustrated in FIGS. 2, 3, and/or 4. Similarly to the PDCCH, the EPDCCH may have one or more common search spaces and one or more UE-specific search spaces In some cases, the EPDCCH may have only UE-specific search space(s). While the PDCCH for a component carrier occupies substantially the full bandwidth of a component carrier at the beginning of a subframe, EPDCCH 505 may be scheduled over a subset of subcarriers of the component carrier 205-c and over one or more subframes. An EPDCCH set may be defined as a group of N PRB pairs (e.g., each resource set may be its own size (e.g., 2, 4 or 8 PRB pairs)).

Each EPDCCH set may be configured for either localized or distributed EPDCCH. UEs may not monitor EPDCCH and PDCCH within the same subframe on the same component carrier. PRB pairs of EPDCCH sets with different logical EPDCCH set indices may be fully overlapped, partially overlapped, or non-overlapping. A UE may be configured to monitor EPDCCH in a subset of downlink (DL) subframes. The UE may monitor PDCCH in subframes that are not configured for EPDCCH.

Figure 6:
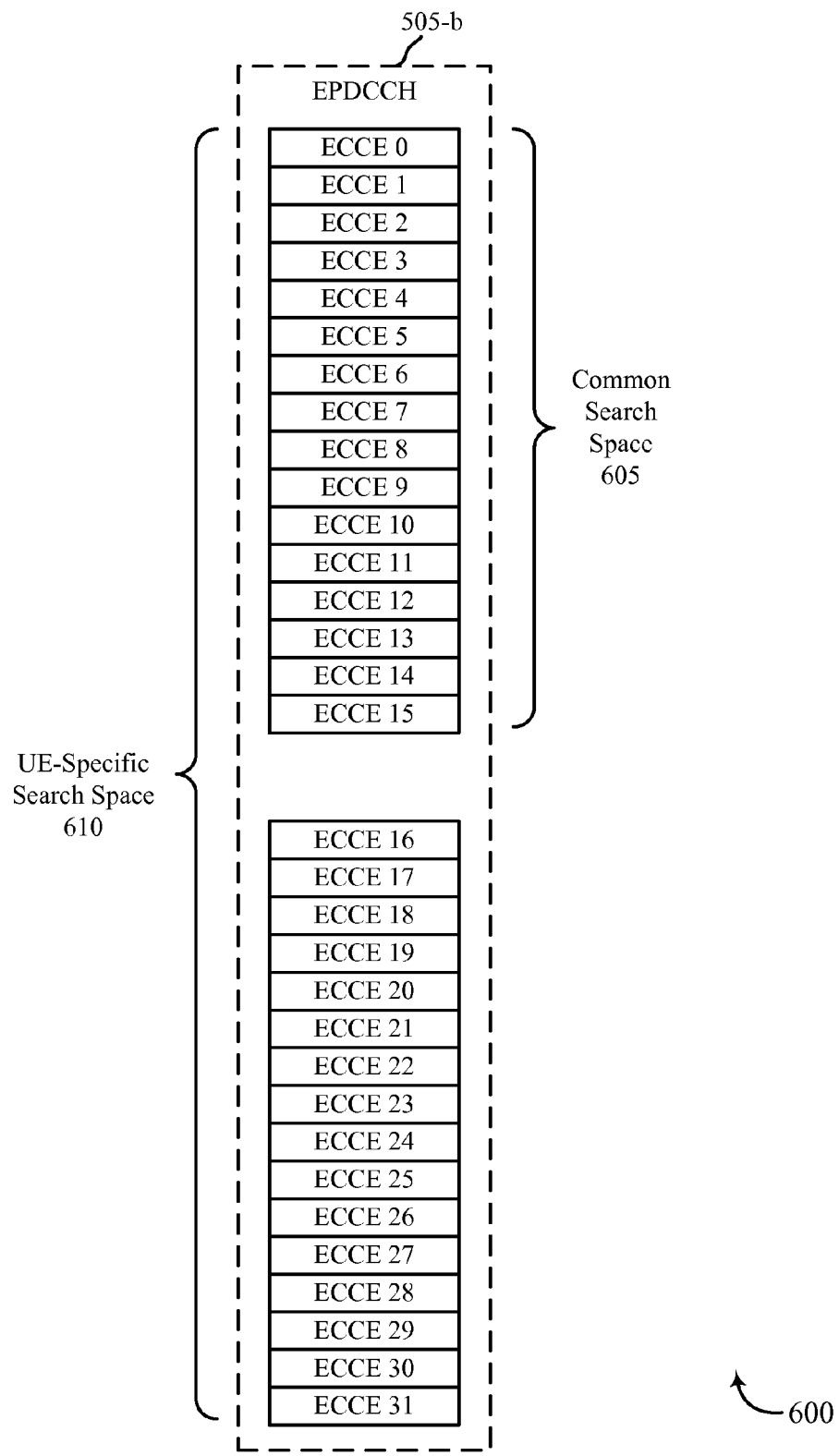
FIG. 6 illustrates an exemplary search space on an EPDCCH that is divided into a common search space and a UE-specific search space.

FIG. 6 illustrates an exemplary search space 600 on an EPDCCH 505-b that is divided into a common search space 605 and a UE-specific search space 610. It should be noted that while, for simplicity, the exemplary search space 610 of FIG. 6 is illustrated as a collection of 32 logically contiguous ECCE blocks, it is understood that the disclosed embodiments can be implemented using a different number of ECCEs. It should also be noted that while a common search space is illustrated in FIG. 6, there may not exist a common search space for EPDCCH in some cases. If there is at least one common search space for EPDCCH, the at least one common search space may (or may not) use the same ECCE definition as that of the UE-specific search space. In addition, the at least one common search space may (or may not) overlap with the UE-specific search space for EPDCCH. It should also be noted that while it is illustrated that the UE-specific search space 610 is defined based on 32 ECCEs, the number of ECCEs for the UE-specific search space may be any number of ECCEs. The number of ECCEs in the search space may be determined in a cell-specific manner or a UE-specific manner.

Each ECCE may include a fixed number of resource elements in non-contiguous locations. Alternatively, the ECCEs may be arranged in non-contiguous locations within the resource blocks of one or more downlink control channels. Moreover, the common search space 605 and the UE-specific search space 610 may span overlapping ECCEs. ECCEs may be numbered consecutively. As previously mentioned, the common search space may start from ECCE 0, while UE specific search space has starting ECCE indices that may depend on the UE ID (e.g., C-RNTI), the sub frame index, the ECCE aggregation level and other random seeds.

The number of ECCEs (denoted by $N_{ECCE}$), available for EPDCCH may be determined based on the system bandwidth, the size of the control region, and the configuration of other control signals, etc. The set of ECCEs for the common search space ranges from 0 to min $\{16, N_{ECCE-1}\}$. For all the UEs, the set of ECCEs for the UE-specific search space may range from 0 to $N_{ECCE}$-1, a superset of those for the common search space. For a specific UE, the set of ECCEs for the UE is a subset of the entire set within the range from ECCE 0 to ECCE $N_{ECCE}$-1, depending on the configured identifier and other factors. In the example in FIG. 6, $N_{ECCE}$=32.

Figure 7:
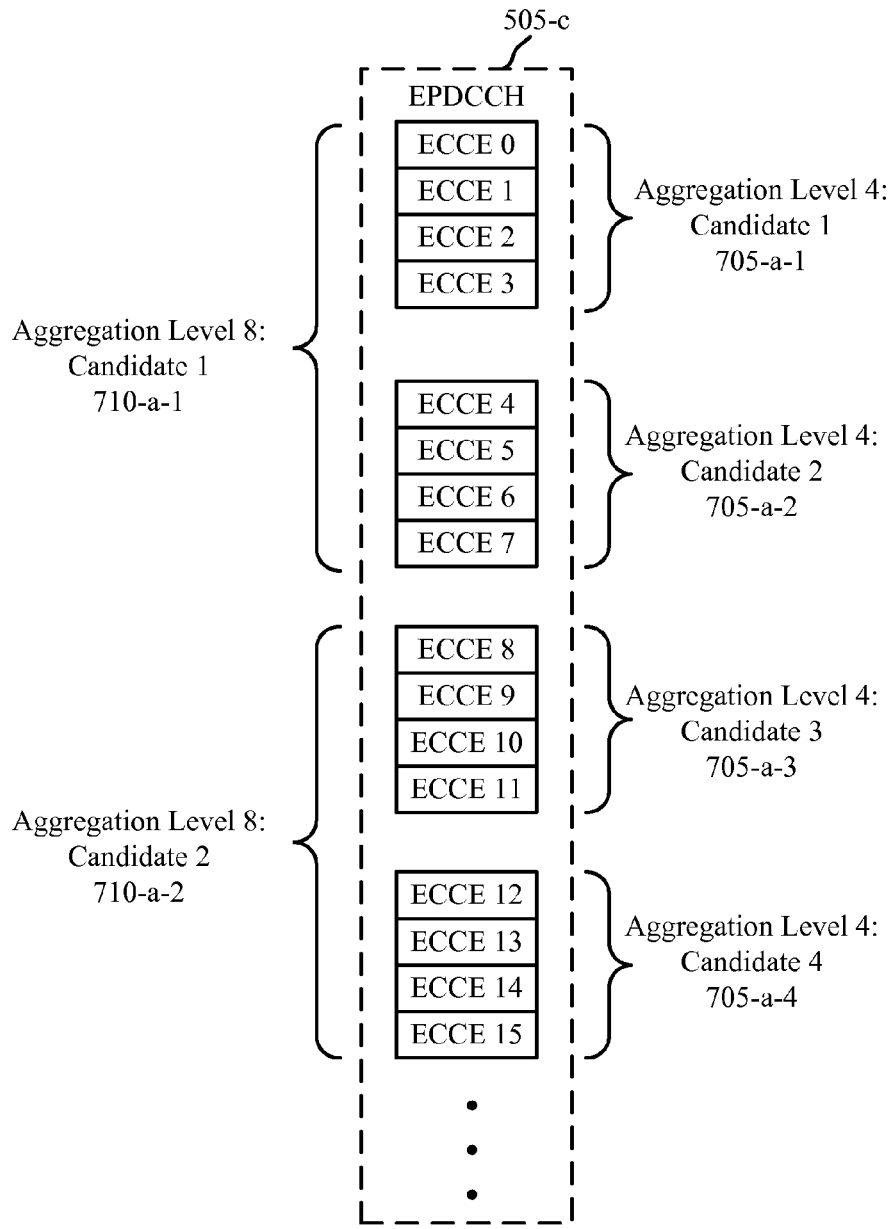
FIG. 7 provides an exemplary diagram of a common search space on an EPDCCH.

The size of a search space, such as search space 610 of FIG. 6, or a set of ECCE locations can be based upon an aggregation level. As noted earlier, the size of a DCI message can depend on the DCI format and the transmission bandwidth. The aggregation level specifies a number of logically or physically contiguous ECCEs utilized to convey a single DCI payload. The common search space may include two possible aggregation levels, level-4 (e.g., 4 ECCEs) and level-8 (e.g., 8 ECCEs). In some systems, to reduce the computations that must be performed by a UE, aggregation level-4 of the common search space can be configured to accommodate a maximum of four DCI locations. Similarly, aggregation level-8 of the common search space can be configured to accommodate a maximum of 2 DCI locations. FIG. 7 provides an exemplary diagram of a common search space 700 on an EPDCCH 505-c that is configured to accommodate four aggregation level-4 candidates 705-a-1, 705-a-2, 705-a-3, and 705-a-4 and two aggregation level-8 candidates 710-a-1 and 710-a-2. Accordingly, there are a total of 6 candidates in the common search space 700 in the exemplary diagram of FIG. 7.

Figure 8:
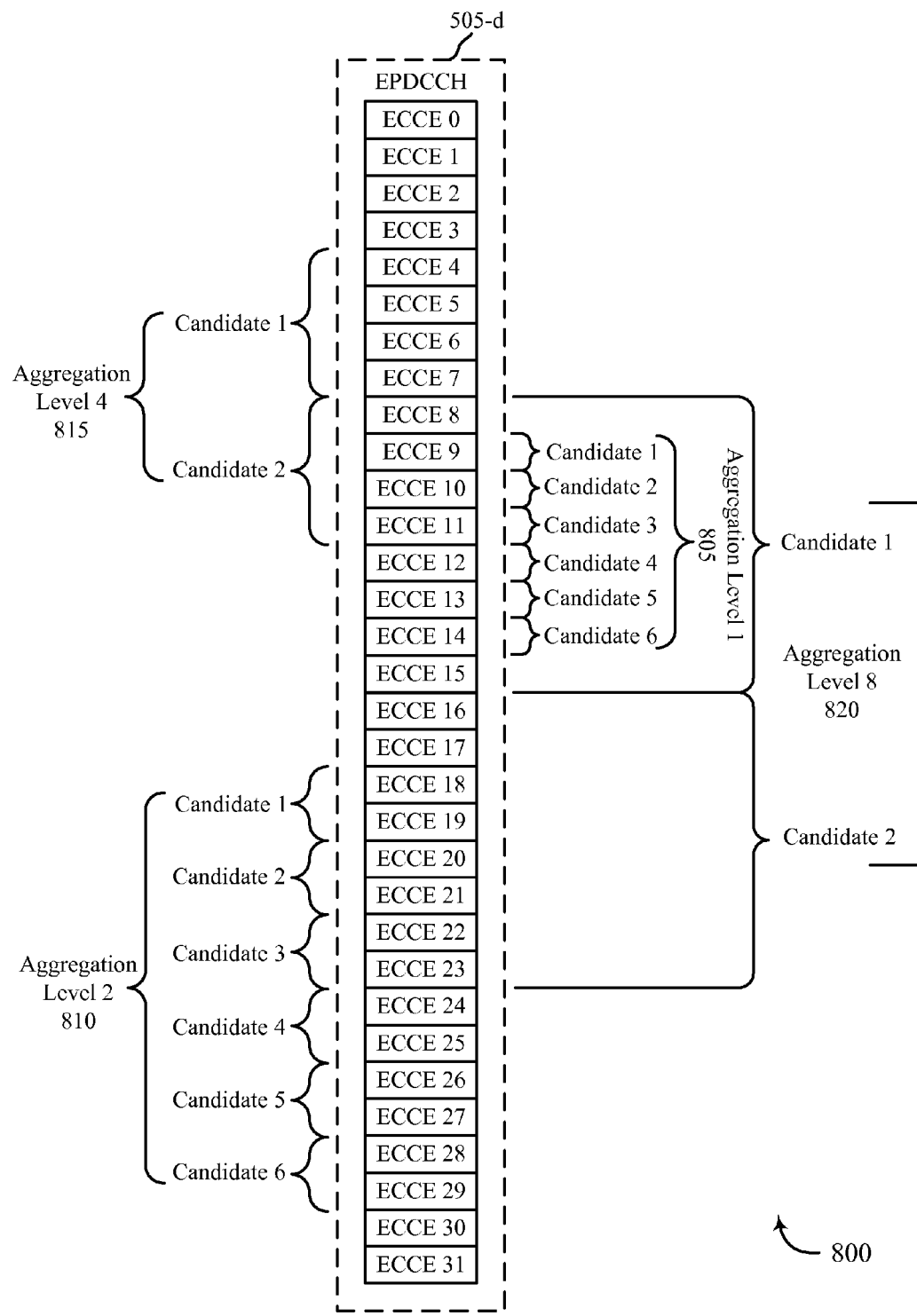
FIG. 8 provides an exemplary diagram of a UE-specific search space on an EPDCCH.

The UE-specific search space can be configured to include a set of aggregation levels. As an example, the set of aggregation levels may include 1, 2, 4, or 8, corresponding to 1, 2, 4, and 8 ECCEs, respectively. It is also possible to have other aggregation levels, e.g., 16, 32, etc. FIG. 8 provides an exemplary diagram of a UE-specific search space 800 on an EPDCCH 505-d that is configured to accommodate six aggregation level-1 candidates 805, six aggregation level-2 candidates 810, two aggregation level-4 candidates 815, and two aggregation level-8 candidates 820. Accordingly, there are a total of 16 candidates in the UE-specific search space 800 in the exemplary diagram of FIG. 8.

It should be noted in the example of FIG. 8 that the starting ECCE indices for the four aggregation levels are different and follow a so-called "tree-structure" used in LTE Rel-8. That is, for aggregation level L, the starting ECCE index may be an integer multiples of L. Within each aggregation level, the search space is logically contiguous. The starting ECCE index for each aggregation level may also depend on time (i.e., sub frame number). In other contemplated embodiments, the starting ECCE indices for each aggregation level may be the same or different.

Further, as discussed earlier, for a given UE, the UE-specific search space is a subset of the set $\{0, N_{ECCE}-1\}$, where $N_{ECCE}$ is the total number of available ECCEs. In the example shown in FIG. 8, $N_{ECCE}=32$. For example, due to the "tree-structure" and potentially different starting ECCE indices for different aggregation levels, in a sub frame, a UE may have ECCE 9 as the starting ECCE index for aggregation level-1, ECCE 18 for aggregation level-2, ECCE 4 for aggregation level-4, and ECCE 8 for aggregation level-8. Since the UE-specific search space for each aggregation level is contiguous, the 2 candidates for aggregation level-4 for the UE are ECCEs $\{4, 5, 6, 7\}$ and ECCEs $\{8, 9, 10, 11\}$. It should be further noted that the common search space 700 of FIG. 7 and the UE-specific search space 800 of FIG. 8 are provided to facilitate the understanding of the underlying concepts associated with the disclosed embodiments. Therefore, it should be understood that common and UE-specific search spaces with different number and configurations of candidate locations may be configured and used in accordance with the disclosed embodiments.

Each candidate in the common search space and UE-specific search space represents a possible DCI transmission. If, for example, the DCI is for a specific UE, the CRC may be masked with a C-RNTI. If the DCI contains paging information or system information, for example, the CRC is masked with a paging RNTI (P-RNTI) or a system-information RNTI (SIRNTI). In other examples, additional RNTIs or other codes may be used for masking the CRC. As noted earlier, a UE conducts a blind decode to discover the location of the control information. For instance, in the example UE-specific search space 800 that is depicted in FIG. 8, a UE may conduct up to 16 decode attempts to determine which of the UE-specific candidate locations 805, 810, 815, 820 (if any) contain the DCI information associated with that UE. Additional decoding attempts may be needed due to additional RNTIs, DCI formats, and multiple EPDCCH candidates.

In some embodiments, the number of DCI blind decodes can be limited by configuring each UE (e.g., via higher layers using RRC signaling) to operate in one of several transmission modes in a semi-static manner. In one embodiment, each transmission mode may be associated with two downlink DCI formats of different sizes, one of which may be DCI format 1A. In this example, the DCI formats 0 and 1A may be forced to be of the same size (e.g., via zeropadding, if needed). As a result, each transmission mode may have a maximum of two associated DCI format sizes: one corresponding to formats 0/1A and the other corresponding to another DCI format. Using the common and UE-specific search spaces that are illustrated in FIGS. 6 through 8, the maximum number of blind decodes can be calculated as: (2 DCI sizes)×(6+16 search candidates)=44. In another embodiment, in order to support UL MIMO, a third DCI format size may be introduced in the UE-specific search space, such that the maximum number of blind decodes becomes (2 DCI sizes)×6+(3 DCI sizes)×16=60. It should be noted that the maximum number of decode attempts can be generalized as: $N_{DC1}=$ (total number of DCI sizes)×(number of search candidates).

Figure 9:
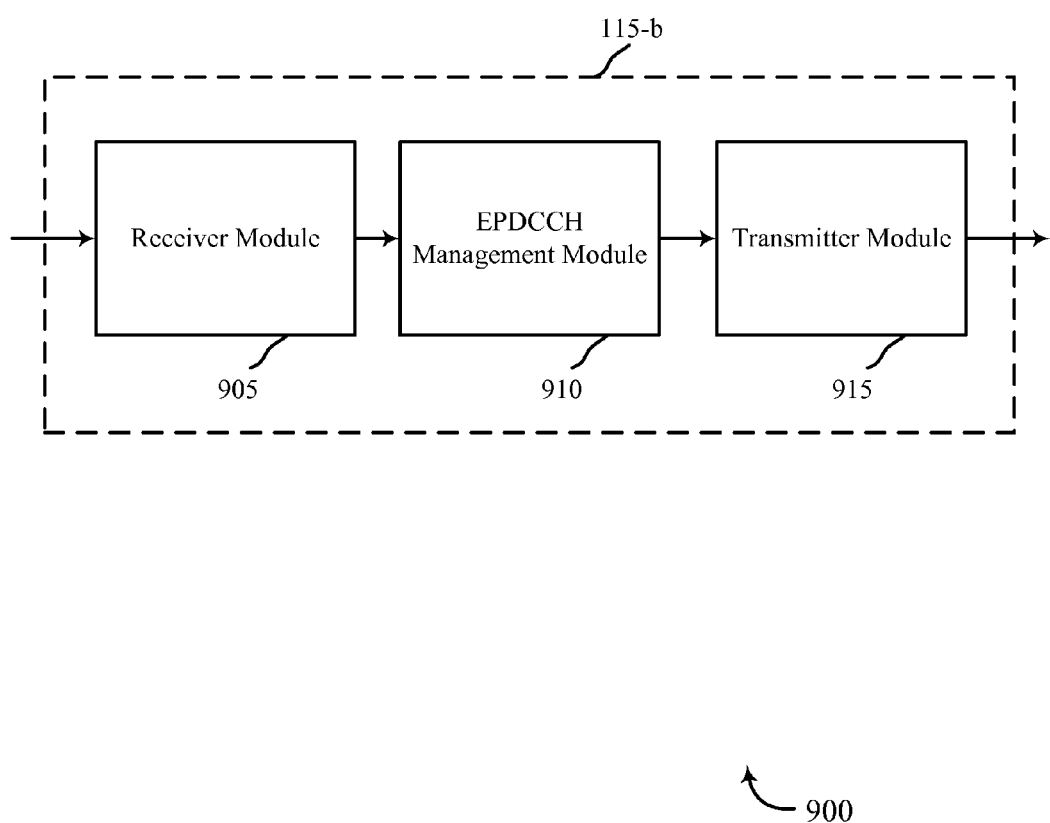
FIG. 9 is a block diagram illustrating one embodiment of a UE in accordance with the present systems and methods.

FIG. 9 is a block diagram 900 illustrating one embodiment of a UE 115-b in accordance with the present systems and methods. The UE 115-b may be an example of the UE 115 illustrated in FIGS. 1 and/or 2. The UE 115-b may include a receiver module 905, an EPDCCH management module 910, and a transmitter module 915. Each of these components may be in communication with each other.

These components of the UE 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 905 may include a cellular receiver and may receive transmissions from an eNB 105. The EPDCCH management module 910 may manage EPDCCH transmissions that may be received via the receiver module 905. For example, the module 910 may identify decoding candidates that may be used to decode the EPDCCH. The module 910 may also identify the antenna port mapped from each identified decoding candidate. Details regarding the EPDCCH management module 910 will be described below.

Figure 10:
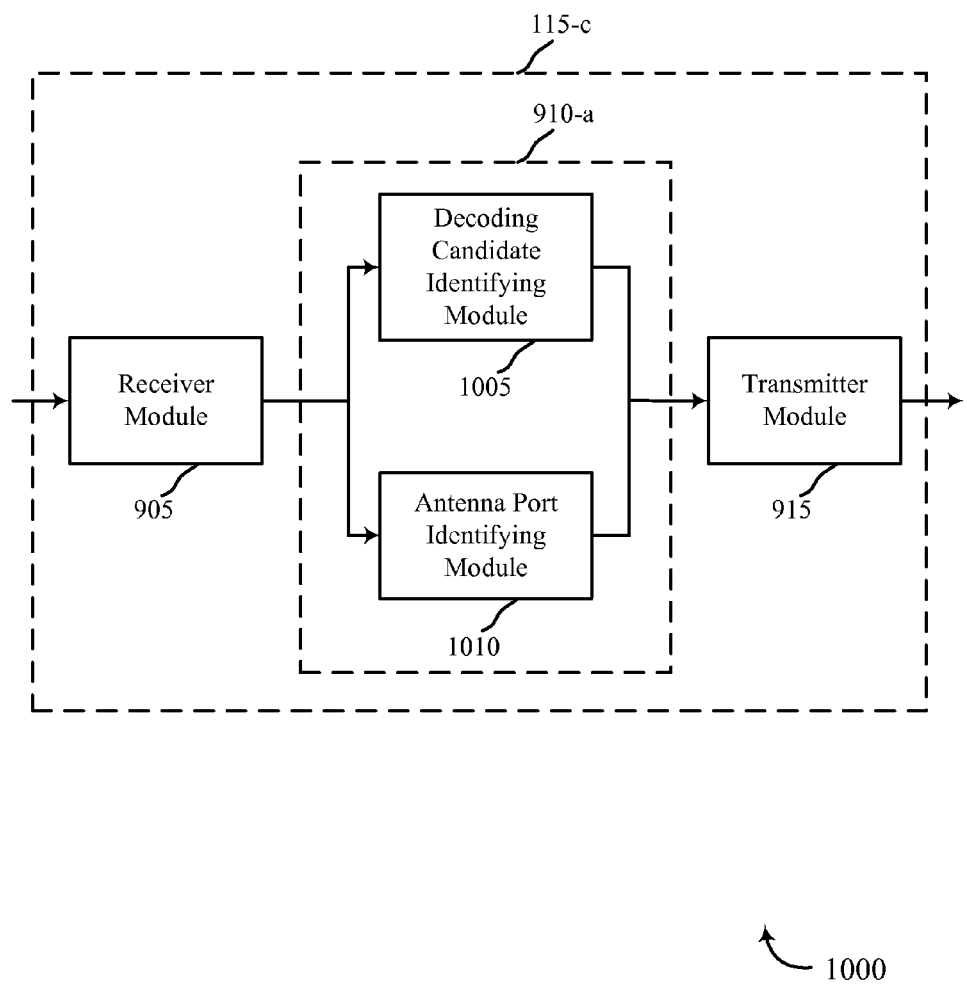
FIG. 10 is a block diagram illustrating a further embodiment of the UE in accordance with the present systems and methods.

FIG. 10 is a block diagram 1000 illustrating one embodiment of a UE 115-c in accordance with the present systems and methods. The UE 115-c may be an example of the UE 115 illustrated in FIGS. 1, 2, and/or 9. The UE 115-c may include a receiver module 905, an EPDCCH management module 910-a, and a transmitter module 915, as previously described. Each of these components may be in communication with each other.

These components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the EPDCCH management module 910-a may include a decoding candidate identifying module 1005. The module 1005 may identify one or more decoding candidates from a number of candidates for a localized EPDCCH transmission. The identified decoding candidates may be in a same or different aggregation level in a UE-specific search space. The EPDCCH management module 910-a may further include an antenna port identifying module 1010. The module 1010 may identify an antenna port, from a set of antenna ports, that is mapped from each identified decoding candidate. In one configuration, each identified decoding candidate may be mapped to a single antenna port. In one example, multiple decoding candidates may be mapped to a same antenna port. In another example, each identified decoding candidate may be mapped to a different antenna port identified by the antenna port identifying module 1010.

Figure 11:
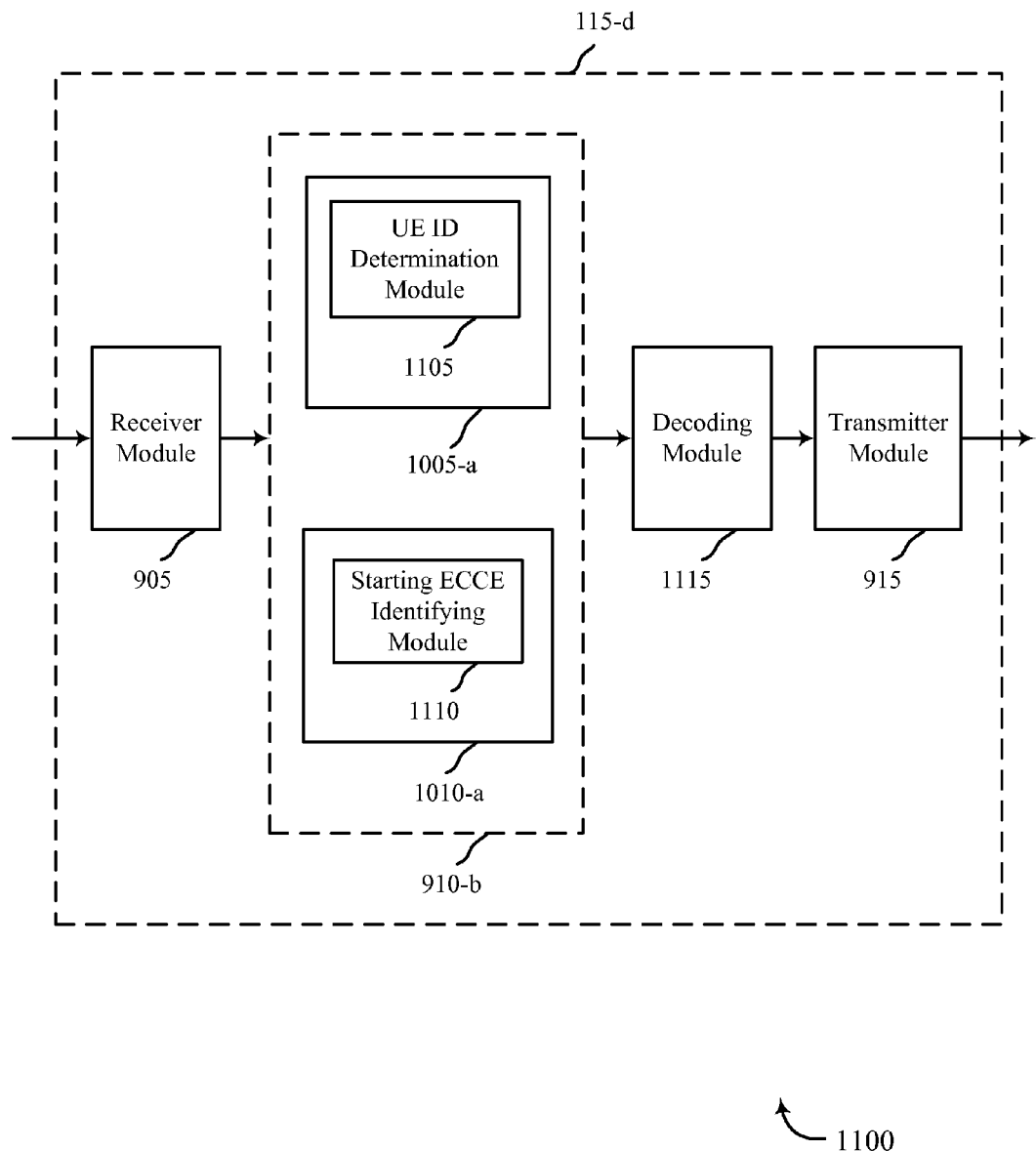
FIG. 11 is a block diagram illustrating an additional embodiment of the UE in accordance with the present systems and methods.

FIG. 11 is a block diagram 1100 illustrating one embodiment of a UE 115-d in accordance with the present systems and methods. The UE 115-d may be an example of the UE 115 illustrated in FIGS. 1, 2, 9, and/or 10. The UE 115-d may include a receiver module 905, an EPDCCH management module 910-b, and a transmitter module 915, as previously described. Each of these components may be in communication with each other.

These components of the UE 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the EPDCCH management module 910-b may include a decoding candidate identifying module 1005-a and an antenna port identifying module 1010-a. In one configuration, the decoding candidate identifying module 1005-a may include a UE-ID determination module 1105. The UE-ID determination module 1105 may identify the ID of the UE 115-d. For example, the module 1105 may determine the C-RNTI that has been assigned to the UE 115-d. The assigned C-RNTI may indicate a location of a starting ECCE for a decoding candidate. The decoding candidate identifying module 1005-a may use the determined UE-ID to identify one or more decoding candidates for a localized EPDCCH transmission. The identifying module 1005-a may also use a subframe index, the ECCE aggregation level, etc. to identify the one or more decoding candidates for the localized EPDCCH.

In one embodiment, the antenna port identifying module 1010-a may include a starting ECCE identifying module 1110. The module 1110 may identify a starting index of an ECCE associated with an identified decoding candidate. For example, using the example embodiment of FIG. 8, the decoding candidate identifying module 1005-a may identify "Candidate 1" of aggregation level-4 815 as a decoding candidate for a particular PRB pair. The starting ECCE indentifying module 1110 may identify ECCE 4 as the starting index location for "Candidate 1". The antenna port identifying module 1010-a may identify one antenna port (from a set of antenna ports) that is mapped from this identified decoding candidate.

Thus, in one embodiment, for localized EPDCCH, a one-to-one map between an antenna port (e.g., DM-RS port) and a decoding candidate is used. As a result, each decoding candidate of localized EPDCCH is only associated with one DM-RS port (i.e., an EPDCCH decoding candidate of localized EPDCCH is not associated with two or more antenna ports). This one-to-one mapping may be established without causing the UE 115-d to perform extra blind decoding.

In one configuration, different decoding candidates of the same search space may be associated with different DM-RS ports. In some cases, up to four antenna ports may be used for EPDCCH transmissions. Further, two decoding candidates of the same or different aggregation levels may be mapped to the same antenna port. For example, within the same aggregation level, different decoding candidates that are located in different PRB pairs may be mapped to the same antenna port.

In one configuration, the UE 115-d may further include a decoding module 1115. The decoding module 1115 may perform a blind decoding process to attempt to decode the EPDCCH transmission. The decoding module 1115 may use the identified decoding candidate and the identified antenna port to perform the blind decode to determine whether or not the EPDCCH can be decoded at the location of the identified decoding candidate.

Figure 12:
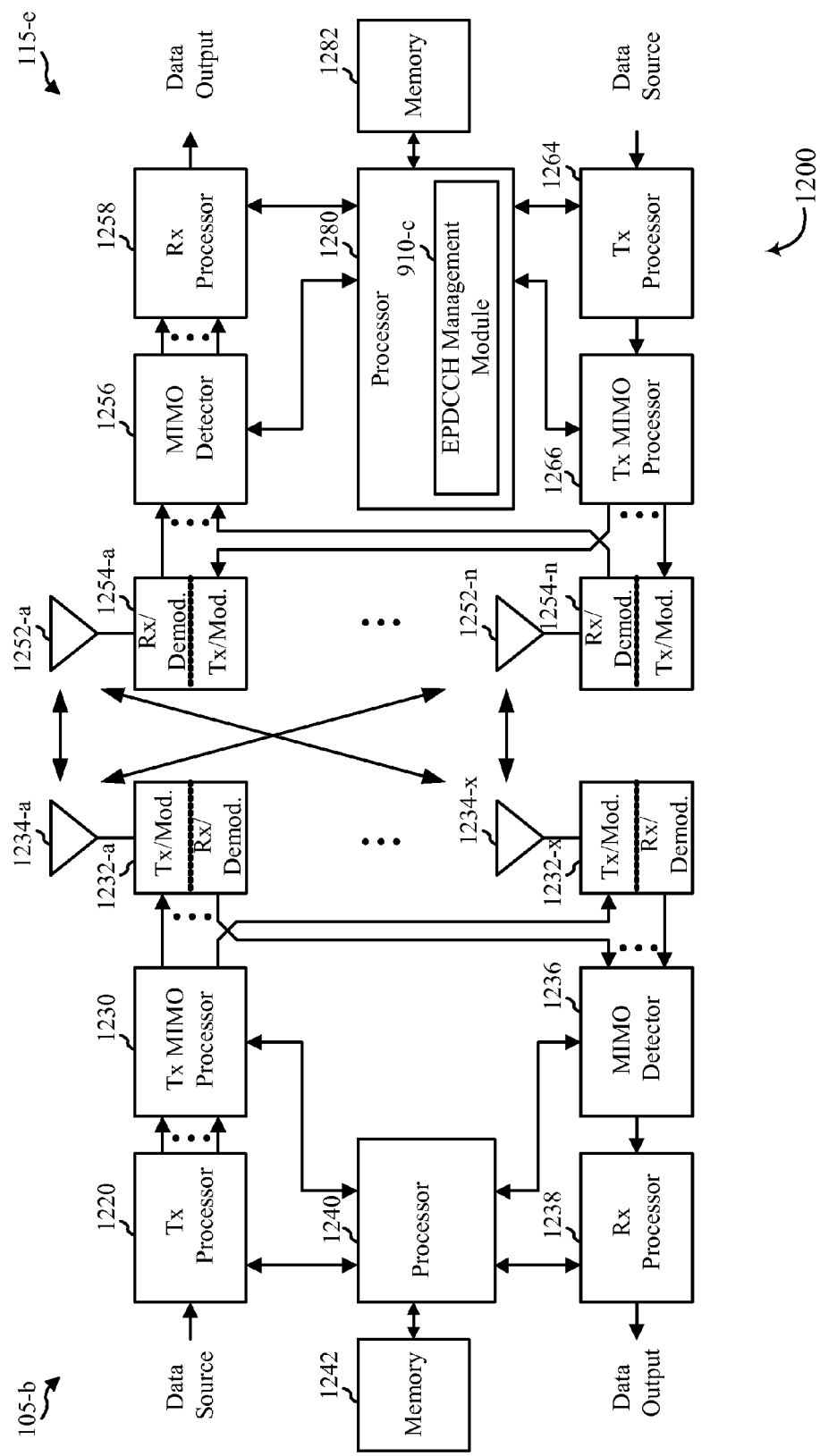
FIG. 12 is a block diagram of a MIMO communication system including an eNB and a UE.

FIG. 12 is a block diagram of a MIMO communication system 1200 including an eNB 105-b and a UE 115-e. This system 1200 may illustrate aspects of the system 100 of FIG. 1. The eNB 105-b may be an example of the eNB 105 of FIGS. 1 and/or 2. The UE 115-e may be an example of the UE 115 of FIGS. 1, 2, 9, 10, and/or 11. The eNB 105-b may be equipped with antennas 1234-a through 1234-x, and the UE 115-e may be equipped with antennas 1252-a through 1252-n. In the system 1200, the eNB 105-b may be able to send data over multiple communication links at the same time. Each communication link may be called a "layer" and the "rank" of the communication link may indicate the number of layers used for communication. For example, in a 2×2 MIMO system where eNB 105-b transmits two "layers," the rank of the communication link between the eNB 105-b and the UE 115-e is two.

At the eNB 105-b, a transmit processor 1220 may receive data from a data source. The transmit processor 1220 may process the data. The transmit processor 1220 may also generate reference symbols, and a cell-specific reference signal. A transmit (TX) MIMO processor 1230 may perform spatial processing (e.g., precoding) on data symbols, control symbols, and/or reference symbols, if applicable, and may provide output symbol streams to the transmit modulators 1232-a through 1232-x. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink signal. In one example, downlink signals from modulators 1232-a through 1232-x may be transmitted via the antennas 1234-a through 1234-x, respectively.

At the UE 115-e, the UE antennas 1252-a through 1252-n may receive the downlink signals from the eNB 105-b and may provide the received signals to the demodulators 1254-a through 1254-n, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254-a through 1254-n, perform MIMO detection on the received symbols if applicable, and provide detected symbols. A receive processor 1258 may process (e.g., demodulate, deinterleave, and decode) the detected symbols, providing decoded data for the UE 115-e to a data output, and provide decoded control information to a processor 1280, or memory 1282. In one embodiment, the processor 1280 may include an EPDCCH management module 910-c to implement the systems and methods described herein. The EPDCCH management module 910-c may be examples of the module 910 of FIGS. 9, 10, and/or 11.

On the uplink, at the UE 115-e, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the demodulators 1254-a through 1254-n (e.g., for SC-FDMA, etc.), and be transmitted to the eNB 105-b in accordance with the transmission parameters received from the eNB 105-b. At the eNB 105-e, the uplink signals from the UE 115-e may be received by the antennas 1234, processed by the demodulators 1232, detected by a MIMO detector 1236 if applicable, and further processed by a receive processor. The receive processor 1238 may provide decoded data to a data output and to the processor 1240. The components of the UE 115-*e* may, individually or collectively, be implemented with one or more Application Specific Integrated Circuits (ASICs) adapted to perform some or all of the applicable functions in hardware. Each of the noted modules may be a means for performing one or more functions related to operation of the system 1200.

Similarly, the components of the eNB 105-*b* may, individually or collectively, be implemented with one or more Application Specific Integrated Circuits (ASICs) adapted to perform some or all of the applicable functions in hardware. Each of the noted components may be a means for performing one or more functions related to operation of the system 1200.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Figure 13:
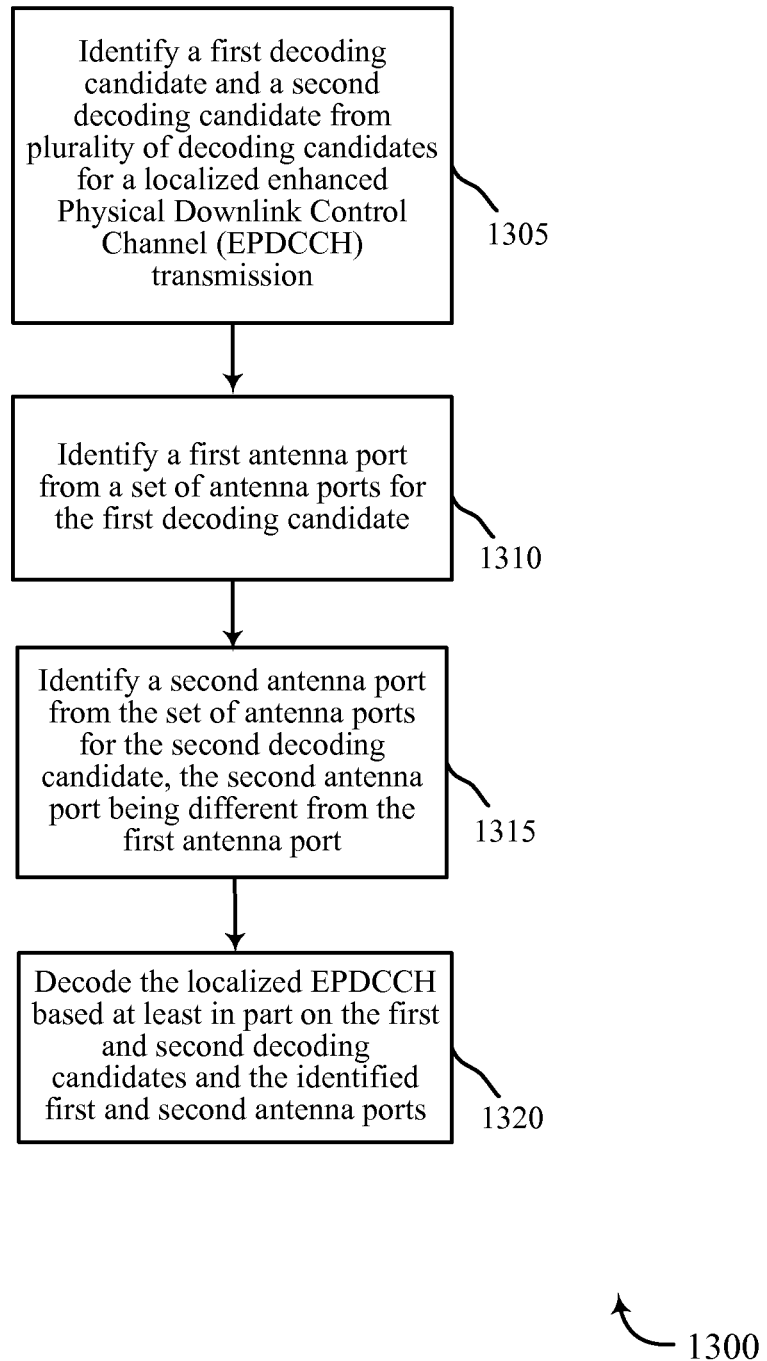
FIG. 13 is a flow chart illustrating one embodiment of a method for wireless communications.

FIG. 13 is a flow chart illustrating one embodiment of a method 1300 for wireless communications. For clarity, the method 1300 is described below with reference to the UE 115 of FIGS. 1, 2, 9, 10, 11, and/or 12. In one implementation, the EPDCCH management module 910 of FIGS. 9, 10, 11, and/or 12 may execute one or more sets of codes to control the functional elements of the UE 115 to perform the functions described below.

At block 1305, a first decoding candidate and a second decoding candidate may be identified. The first and second candidates may be identified from a plurality of decoding candidates for a localized EPDCCH transmission. At block 1310, a first antenna port may be identified from a set of antenna ports for the first decoding candidate. At block 1315, a second antenna port may be identified from the set of antenna ports for the second decoding candidate. The second antenna port may be different from the first antenna port. At block 1320, the localized EPDCCH may be decoded based at least in part on the first and second decoding candidates and the identified first and second antenna ports.

Therefore, the method 1300 may provide for managing wireless communications by identifying antenna ports mapped from decoding candidates for localized EPDCCH transmissions. It should be noted that the method 1300 is just one implementation and that the operations of the method 1300 may be rearranged or otherwise modified such that other implementations are possible.

Figure 14:
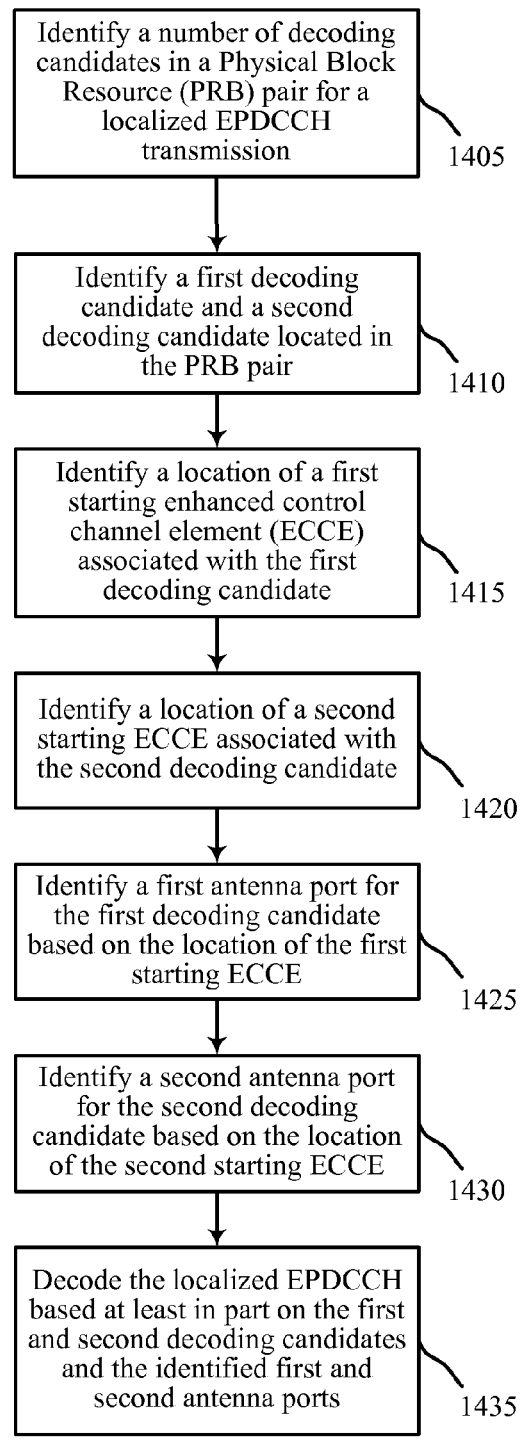
FIG. 14 is a flow chart illustrating a further embodiment of a method for wireless communications.

FIG. 14 is a flow chart illustrating one embodiment of a method 1400 for wireless communications. For clarity, the method 1400 is described below with reference to the UE 115 of FIGS. 1, 2, 9, 10, 11, and/or 12. In one implementation, the EPDCCH management module 910 of FIGS. 9, 10, 11, and/or 12 may execute one or more sets of codes to control the functional elements of the UE 115 to perform the functions described below.

At block 1405, a number of decoding candidates in a PRB pair may be identified for a localized EPDCCH transmission. At block 1410, a first decoding candidate and a second decoding candidate may be identified. The first and second candidates may be located in the same PRB pair. At block 1415, a location of a first starting ECCE may be identified. The first starting ECCE may be associated with the first decoding candidate. At block 1420, a location of a second starting ECCE may be identified. The second starting ECCE may be associated with the second decoding candidate. At block 1425, a first antenna port may be identified for the first decoding candidate based on the location of the first starting ECCE. At block 1430, a second antenna port may be identified for the second decoding candidate based on the location of the second starting ECCE. At block 1435, the localized EPDCCH may be decoded based at least in part on the first and second decoding candidates and the identified first and second antenna ports.

Therefore, the method 1400 may provide for managing wireless communications by identifying antenna ports mapped from decoding candidates for localized EPDCCH transmissions by identifying starting ECCEs associated with each identified decoding candidate. It should be noted that the method 1400 is just one implementation and that the operations of the method 1400 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing wireless communications, comprising:
    identifying a first decoding candidate and a second decoding candidate from a plurality of decoding candidates for a localized enhanced Physical Downlink Control Channel (EPDCCH) transmission, wherein each decoding candidate of the plurality of decoding candidates is associated with one or more enhanced control channel elements (ECCEs) including a starting ECCE;
    identifying a first antenna port from a set of antenna ports for the first decoding candidate;
    identifying a second antenna port from the set of antenna ports for the second decoding candidate, the second antenna port being different from the first antenna port, wherein the identifying the first and second antenna ports is based at least in part on the starting ECCE associated with each decoding candidate, wherein the starting ECCE associated with each decoding candidate is an element of a set comprising a user equipment (UE) specific search space, and wherein the starting ECCE depends upon a UE ID, a subframe index, an ECCE aggregation level, and a random seed; and
    decoding the localized EPDCCH based at least on the first and second decoding candidates and the identified first and second antenna ports.

2. The method of claim 1, wherein the first decoding candidate and the second decoding candidate are located in a same pair of Physical Resource Blocks (PRBs).

3. The method of claim 1, wherein the first decoding candidate and the second decoding candidate are of a same aggregation level comprising an integer number of ECCEs.

4. A device configured to manage wireless communications, comprising:
    a processor;
    a memory; and
    instructions stored in the memory, the instructions being executable by the processor to:
    identify a first decoding candidate and a second decoding candidate from a plurality of decoding candidates for a localized enhanced Physical Downlink Control Channel (EPDCCH) transmission, wherein each decoding candidate of the plurality of decoding candidates is associated with one or more enhanced control channel elements (ECCEs) including a starting ECCE;
    identify a first antenna port from a set of antenna ports for the first decoding candidate;
    identify a second antenna port from the set of antenna ports for the second decoding candidate, the second antenna port being different from the first antenna port, wherein identifying the first and second antenna ports is based at least in part on the starting ECCE associated with each decoding candidate, wherein the starting ECCE associated with each decoding candidate is an element of a set comprising a user equipment (UE) specific search space, and wherein the starting ECCE depends upon a UE ID, a subframe index, an ECCE aggregation level, and a random seed; and decode the localized EPDCCH based at least on the first and second decoding candidates and the identified first and second antenna ports.

5. The device of claim 4, wherein the first decoding candidate and the second decoding candidate are located in a same pair of Physical Resource Blocks (PRBs).

6. The device of claim 4, wherein the first decoding candidate and the second decoding candidate are of a same aggregation level comprising an integer number of ECCEs.

7. An apparatus configured to manage wireless communications, comprising:

means for identifying a first decoding candidate and a second decoding candidate from a plurality of decoding candidates for a localized enhanced Physical Downlink Control Channel (EPDCCH) transmission, wherein each decoding candidate of the plurality of decoding candidates is associated with one or more enhanced control channel elements (ECCEs) including a starting ECCE;

means for identifying a first antenna port from a set of antenna ports for the first decoding candidate;

means for identifying a second antenna port from the set of antenna ports for the second decoding candidate, the second antenna port being different from the first antenna port, wherein the means for identifying the first antenna port and the means for identifying the second antenna port utilize the starting ECCE associated with each decoding candidate to identify the first and second antenna ports, wherein the starting ECCE associated with each decoding candidate is an element of a set comprising a user equipment (UE) specific search space, and wherein the starting ECCE depends upon a UE ID, a subframe index, an ECCE aggregation level, and a random seed; and means for decoding the localized EPDCCH based at least on the first and second decoding candidates and the identified first and second antenna ports.

8. The apparatus of claim 7, wherein the first decoding candidate and the second decoding candidate are located in a same pair of Physical Resource Blocks (PRBs).

9. The apparatus of claim 7, wherein the first decoding candidate and the second decoding candidate are of a same aggregation level comprising an integer number of ECCEs.

10. A non-transitory computer-readable medium storing instructions executable by a processor to:

identify a first decoding candidate and a second decoding candidate from a plurality of decoding candidates for a localized enhanced Physical Downlink Control Channel (EPDCCH) transmission, wherein each decoding candidate of the plurality of decoding candidates is associated with one or more enhanced control channel elements (ECCEs) including a starting ECCE;

identify a first antenna port from a set of antenna ports for the first decoding candidate;

identify a second antenna port from the set of antenna ports for the second decoding candidate, the second antenna port being different from the first antenna port, wherein identifying the first and second antenna ports is based at least in part on the starting ECCE associated with each decoding candidate, wherein the starting ECCE associated with each decoding candidate is an element of a set comprising a user equipment (UE) specific search space, and wherein the starting ECCE depends upon a UE ID, a subframe index, an ECCE aggregation level, and a random seed; and decode the localized EPDCCH based at least on the first and second decoding candidates and the identified first and second antenna ports.

11. The non-transitory computer-readable medium of claim 10, wherein the first decoding candidate and the second decoding candidate are located in a same pair of Physical Resource Blocks (PRBs).

12. The non-transitory computer-readable medium of claim 10, wherein the first decoding candidate and the second decoding candidate are of a same aggregation level comprising an integer number of ECCEs.

* * * * *